United States Patent [19]
Wu et al.

[11] Patent Number: 5,782,468
[45] Date of Patent: Jul. 21, 1998

[54] TRANSMISSION MECHANISM OF A FAX PRINTER FOR PICKING UP AND FEEDING PAPER

[75] Inventors: Hwei-Tsong Wu, Taipei; Kuo-Hua Wu, Hsin Chu Hsien, both of Taiwan

[73] Assignee: Sampo Corporation, Taipei, Taiwan

[21] Appl. No.: 719,465

[22] Filed: Sep. 25, 1996

[51] Int. Cl.$^6$ .................................................. B65H 5/00
[52] U.S. Cl. ............................ 271/10.05; 271/10.11; 271/114; 271/120
[58] Field of Search .................. 271/10.05, 10.09, 271/10.11, 109, 114, 119, 120, 4.04, 4.08, 4.1

[56] References Cited

U.S. PATENT DOCUMENTS

| | | | |
|---|---|---|---|
| 5,213,426 | 5/1993 | Ewing | 400/624 |
| 5,222,724 | 6/1993 | Hirano et al. | 271/10 |
| 5,697,716 | 12/1997 | Akahane | 400/624 |
| 5,704,606 | 1/1998 | Kim | 271/10.13 |

*Primary Examiner*—H. Grant Skaggs
*Assistant Examiner*—Wonki Park
*Attorney, Agent, or Firm*—Rosenberg, Klein & Bilker

[57] ABSTRACT

A transmission mechanism is installed in a machine and driven by a motor to pick up and feed paper. The mechanism includes a transmission gear and a return gear turned by a motor through a reduction gear train, a rocker turned with the transmission gear to move a rocker gear, an idle wheel, a transmission shaft covered with a rubber roll for feeding paper, a paper feeding gear wheel mounted on one end of a transmission shaft and meshed with the return gear, a first paper pick up gear having a peripheral surface section, a second paper pick up gear turned with the first paper pick up gear and having a peripheral surface section, a rubber cam synchronously turned with the first and second paper pick up gears, wherein when the motor is turned in one direction, the rocker is moved rightwards to force the rocker gear into mesh with the first paper pick up gear. When the motor is turned in the reversed direction, the rocker is moved leftwards to disengage the rocker gear from the first paper pick up gear and to force it into engagement with the idle wheel.

1 Claim, 8 Drawing Sheets

5,782,468

TRANSMISSION MECHANISM OF A FAX PRINTER FOR PICKING UP AND FEEDING PAPER

BACKGROUND OF THE INVENTION

The present invention relates to a transmission mechanism for fax machines and printers for picking up and feeding paper, and relates more particularly to such a transmission mechanism which uses a single motor and to turn a set of gears to pick up paper and feed it.

In a fax machine or printer, there is provided a paper pick up transmission mechanism and a paper feed transmission mechanism respectively driven by a respective motor through a respective gear to pick up paper and to feed paper. These two separate transmission mechanisms greatly complicate the structure of the machine and increase its manufacturing cost.

SUMMARY OF THE INVENTION

The present invention has been accomplished to provide a transmission mechanism for fax machines and printers which uses a single motor to turn a set of gears to pick up paper and feed it, so that the manufacturing cost of the fax machine or printer is greatly reduced.

According to the preferred embodiment of the present invention, the transmission mechanism is driven by a motor to pick up and feed paper, comprising a transmission gear and a return gear turned by a motor through a reduction gear train, a rocker turned with the transmission gear to move a rocker gear, an idle wheel, a transmission shaft covered with a rubber roll for feeding paper, a paper feeding gear wheel mounted on one end of a transmission shaft and meshed with the return gear, a first paper pick up gear having a plain peripheral surface section, a second paper pick up gear turned with the first paper pick up gear and having a plain peripheral surface section, a rubber cam synchronously turned with the first and second paper pick up gears, wherein when the motor is turned in one direction, the rocker is moved rightwards to force the rocker gear into mesh with the first paper pick up gear; when the motor is turned in the reversed direction, the rocker is moved leftwards to disengage the rocker gear from the first paper pick up gear and to force it into engagement with the idle wheel.

DETAILED DESCRIPTION OF THE PREFERRED EMBODIMENT

Figure 1:
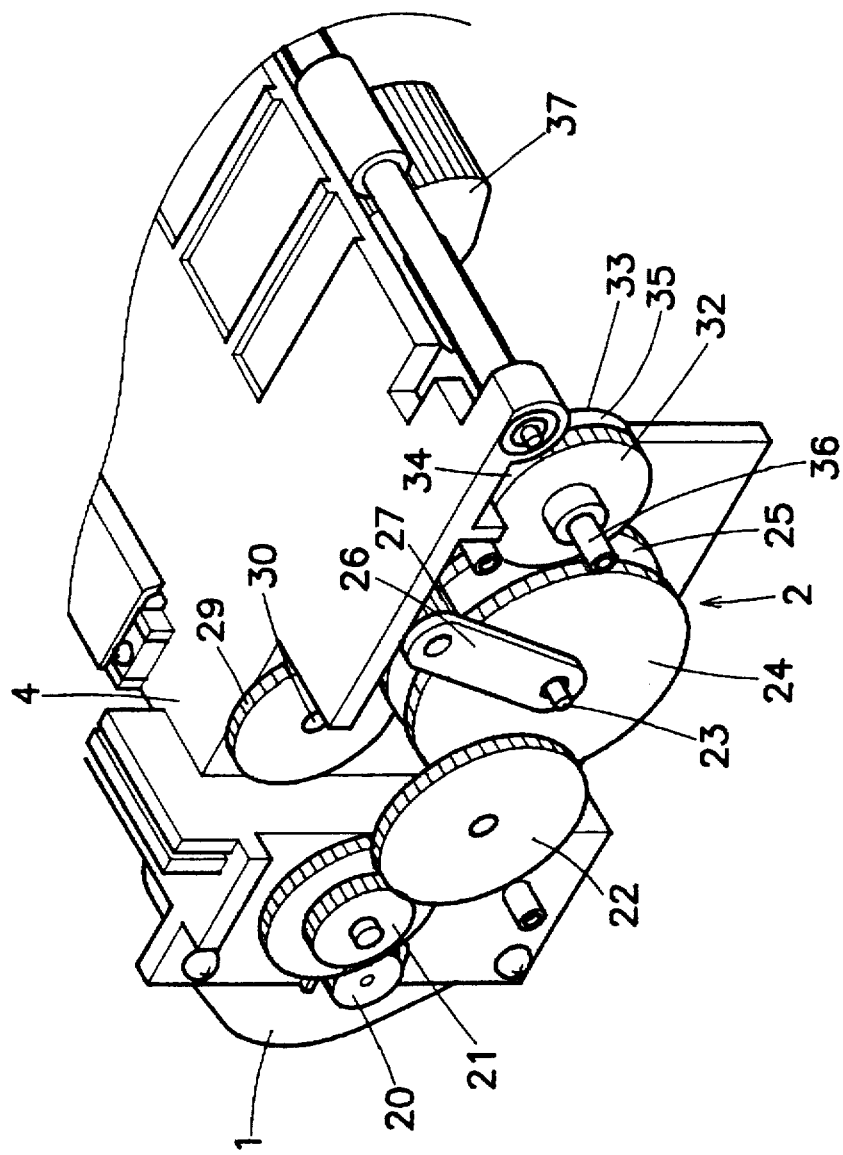
FIG. 1 is an elevational view of a transmission mechanism installed in a machine according to the present invention.
Figure 2:
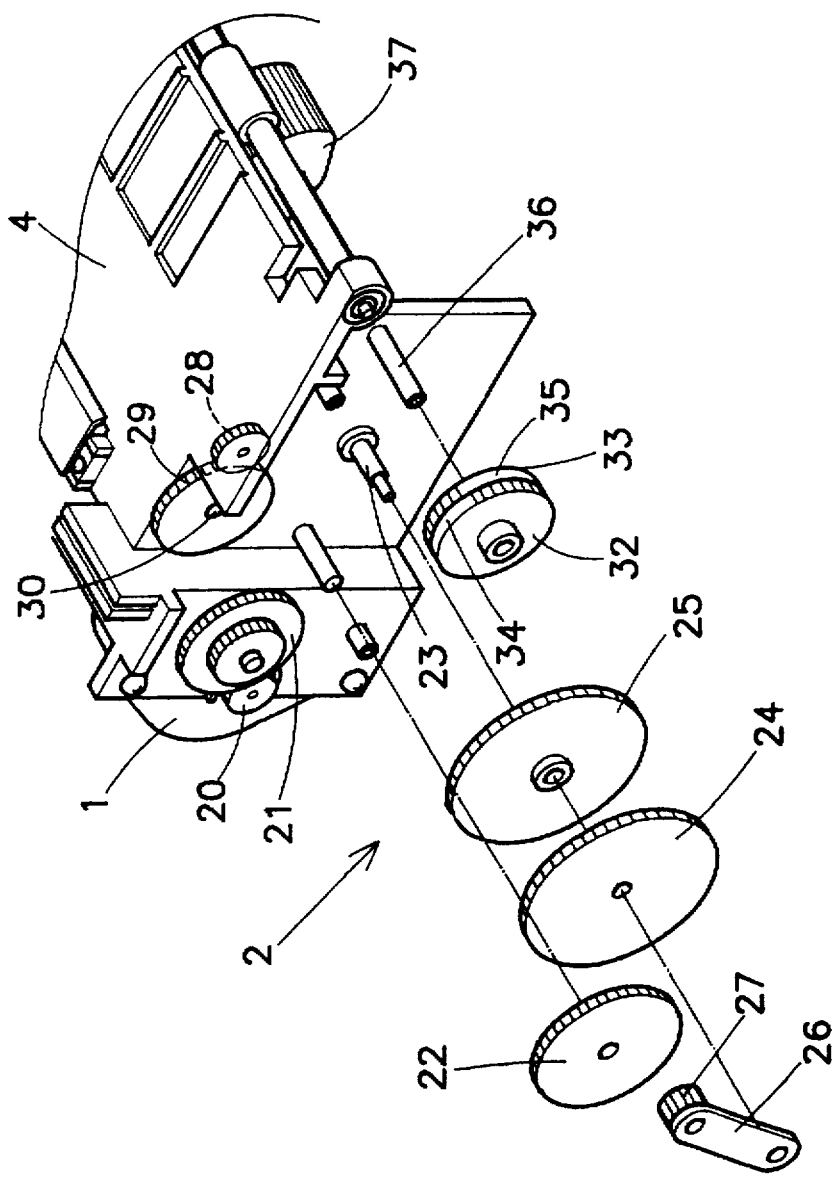
FIG. 2 is an exploded view of the transmission mechanism shown in FIG. 1.
Figure 3:
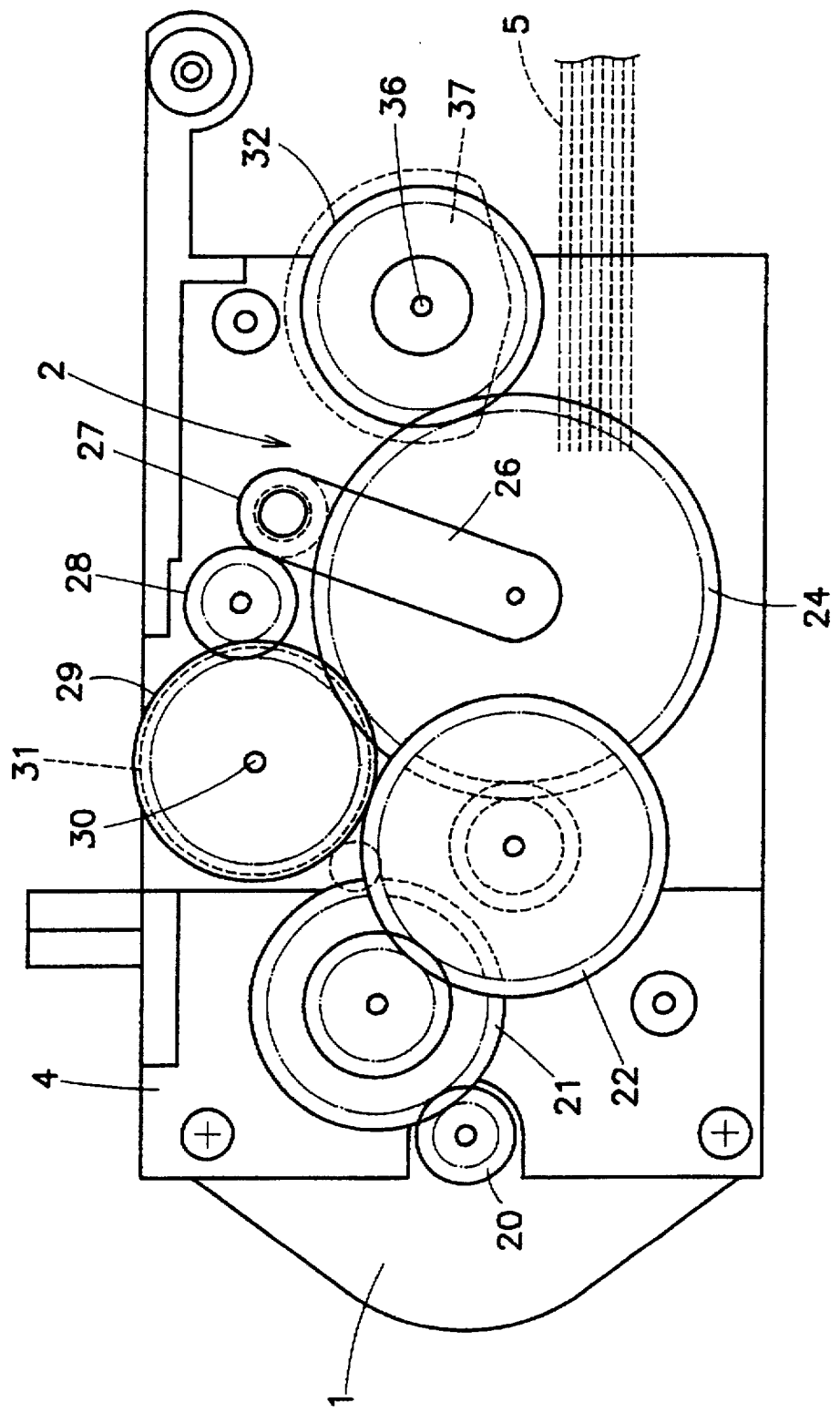
FIG. 3 is a sectional plane view of the present invention.

Referring to FIGS. 1, 2, and 3, a transmission mechanism in accordance with the present invention is generally comprised of a motor 1 mounted on a frame 4 of a fax machine or printer, and a transmission gear set 2 coupled to the motor 1.

The transmission gear set 2 comprises a pinion 20 fixedly mounted around the output shaft of the motor 1, a reduction gear train 21 meshed with the pinion 20, a transmission gear 24 and a return gear 25 mounted on a common shaft 23 in the frame 4 at one side of the output gear 22 of the reduction gear train 21, a rocker 26 having one end connected to the shaft 23 and an opposite end fixedly mounted with a rocker gear 27, which is meshed with the transmission gear 24, an idle wheel 28 mounted on the frame 4 adjacent to the rocker gear 27, a transmission shaft 30 mounted inside the frame 4, a rubber roll 31 mounted around the transmission shaft 30, a paper feeding gear wheel 29 mounted on a transmission shaft 30 at one end and meshed with the return gear 25, a first paper pick up gear 32 mounted on a revolving axle 36 at an outer side, a second paper pick up gear 33 mounted on the revolving axle 36 inside the first paper pick up gear 32 and matched with the return gear 25, a rubber cam 37 mounted on the revolving axle 36 and synchronously turned with the first paper pick up gear 32 and the second paper pick up gear 33. The first paper pick up gear 32 has a plain peripheral surface section 34. The second paper pick up gear 33 has a plain peripheral surface section 35. When the top end of the rocker 26 is moved to the right, the rocker gear 27 is forced into mesh with the first paper pick up gear 32; when the top end of the rocker 26 is moved to the left, the rocker gear 27 is disengaged from the first paper pick up gear 32 and forced into engagement with the idle wheel 28.

Figure 4:
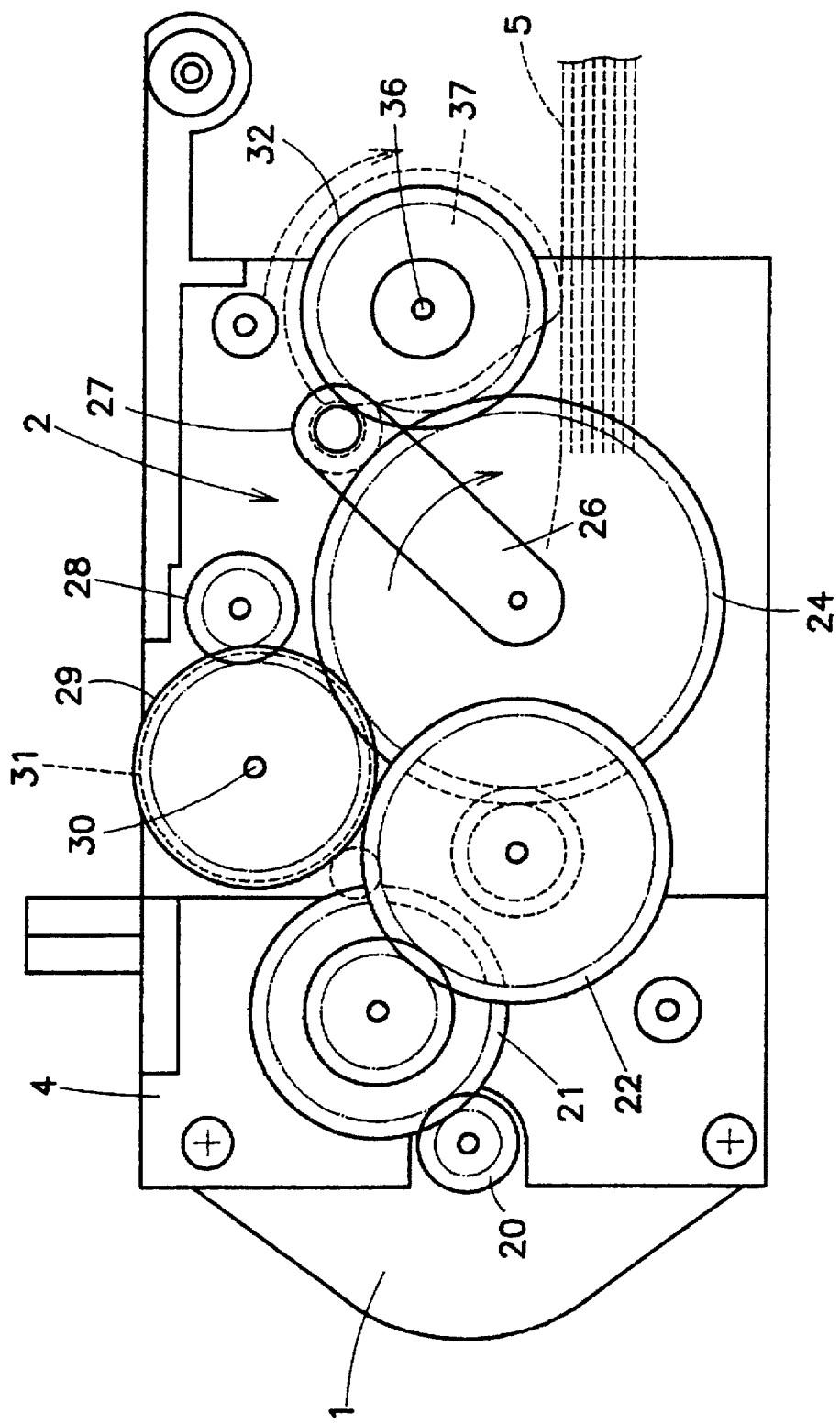
FIG. 4 is another sectional plane view of the present invention, showing the rocker turned to the right, the rocker gear meshed with the first paper pick up gear.
Figure 5:
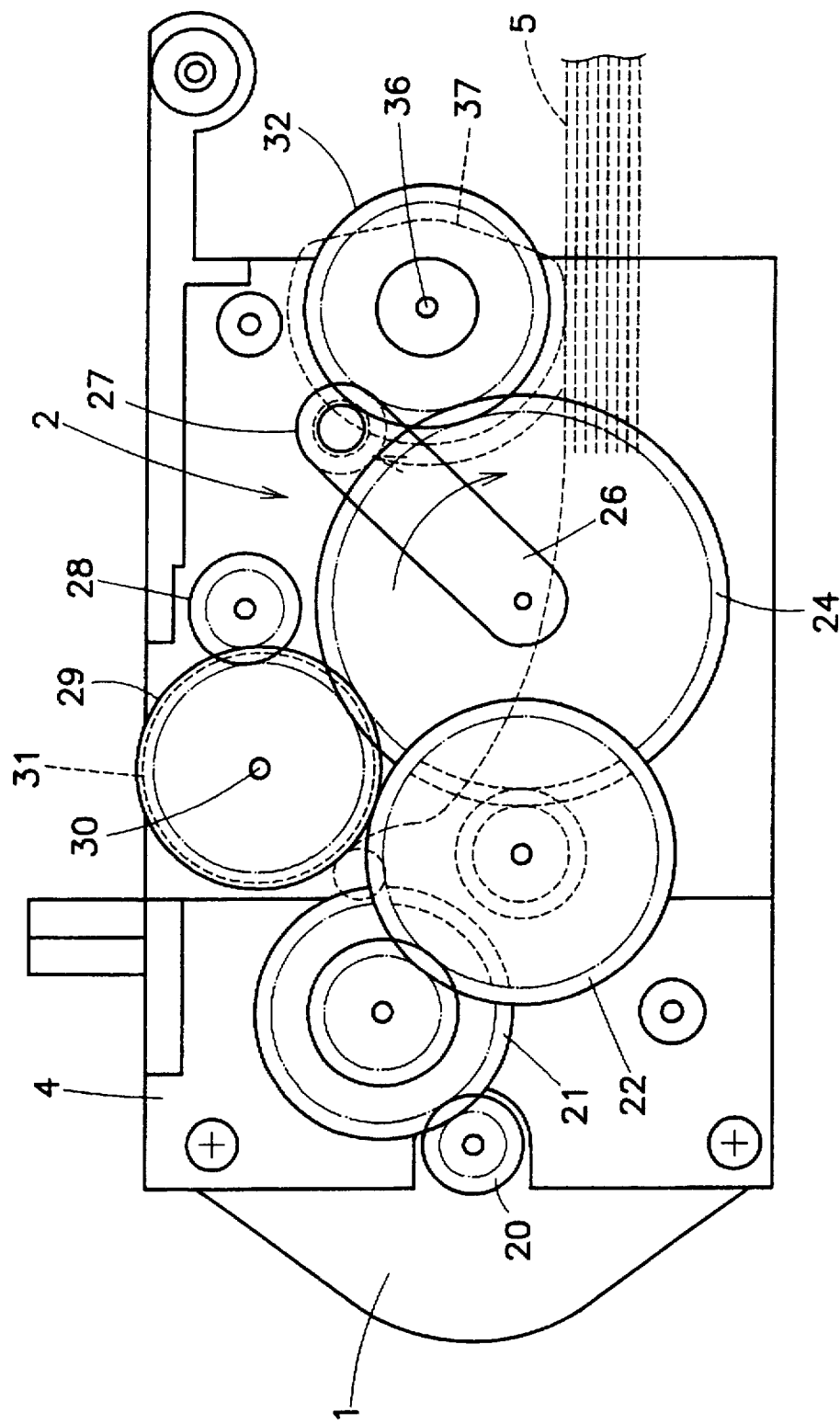
FIG. 5 is another sectional plane view of the present invention, showing paper moved to the rubber roll of the transmission shaft.
Figure 6:
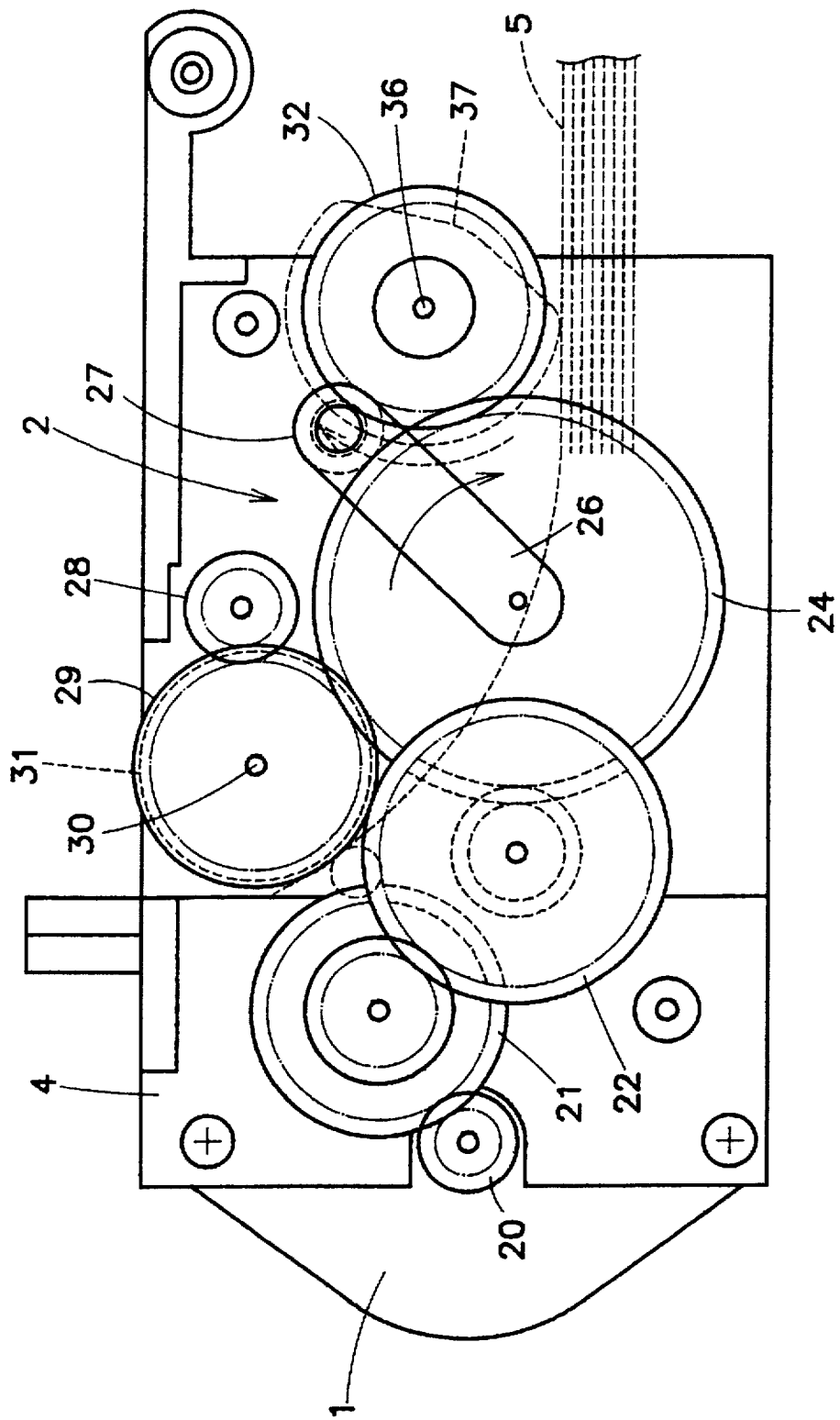
FIG. 6 is still another sectional plane view of the present invention, showing the return gear turned with the second paper pick up gear, and the rubber roll rotated clockwise.
Figure 7:
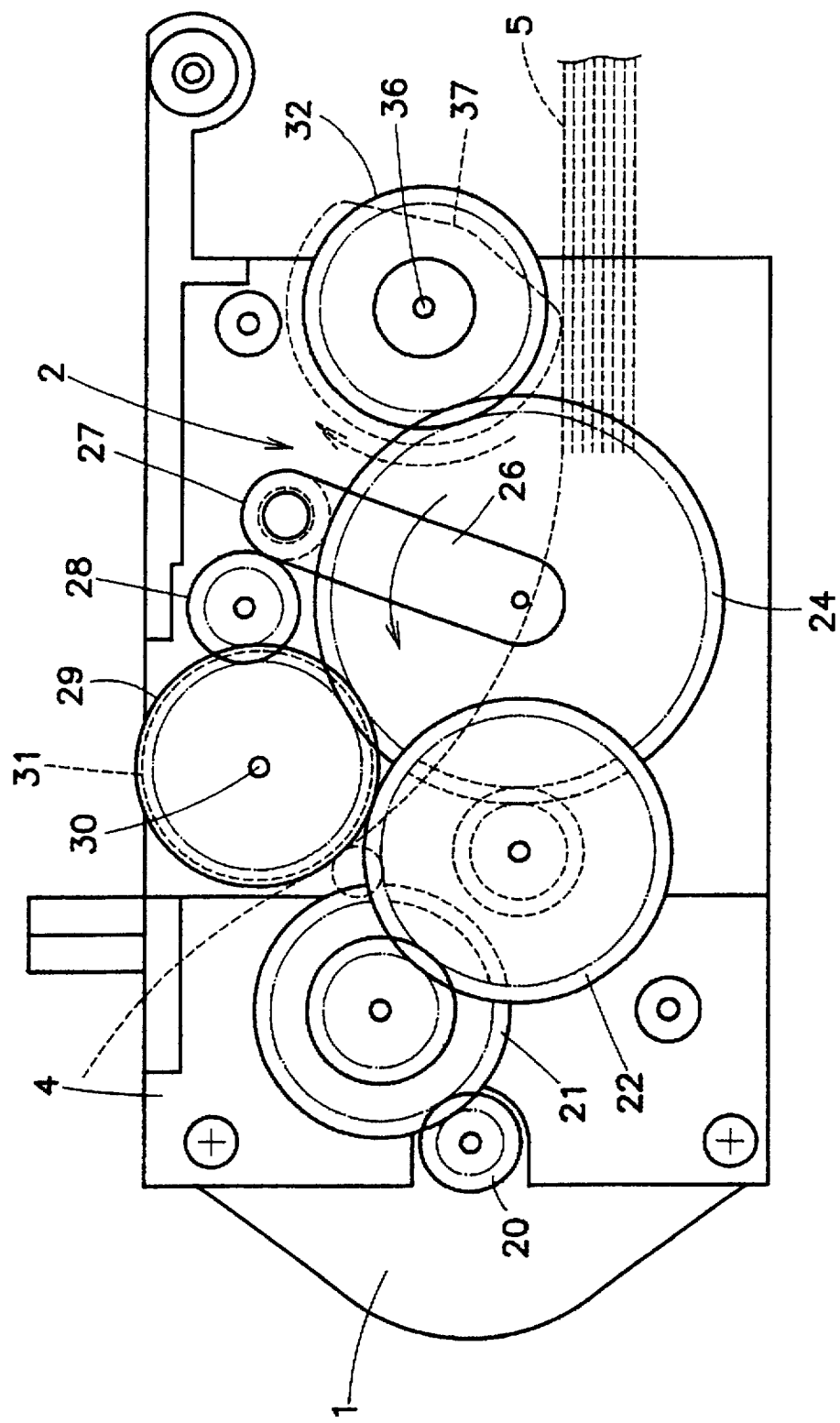
FIG. 7 is still another sectional plane view of the present invention, showing the motor turned clockwise, the rocker gear meshed with idle wheel, and the paper feeding gear wheel synchronously rotated with the idle wheel; and, FIG. 8 is still another sectional plain view of the present invention, showing the first paper pick up gear and the rubber cam moved back to the initial status, and the rubber cam disconnected from the transmission power of the motor.
Figure 8:
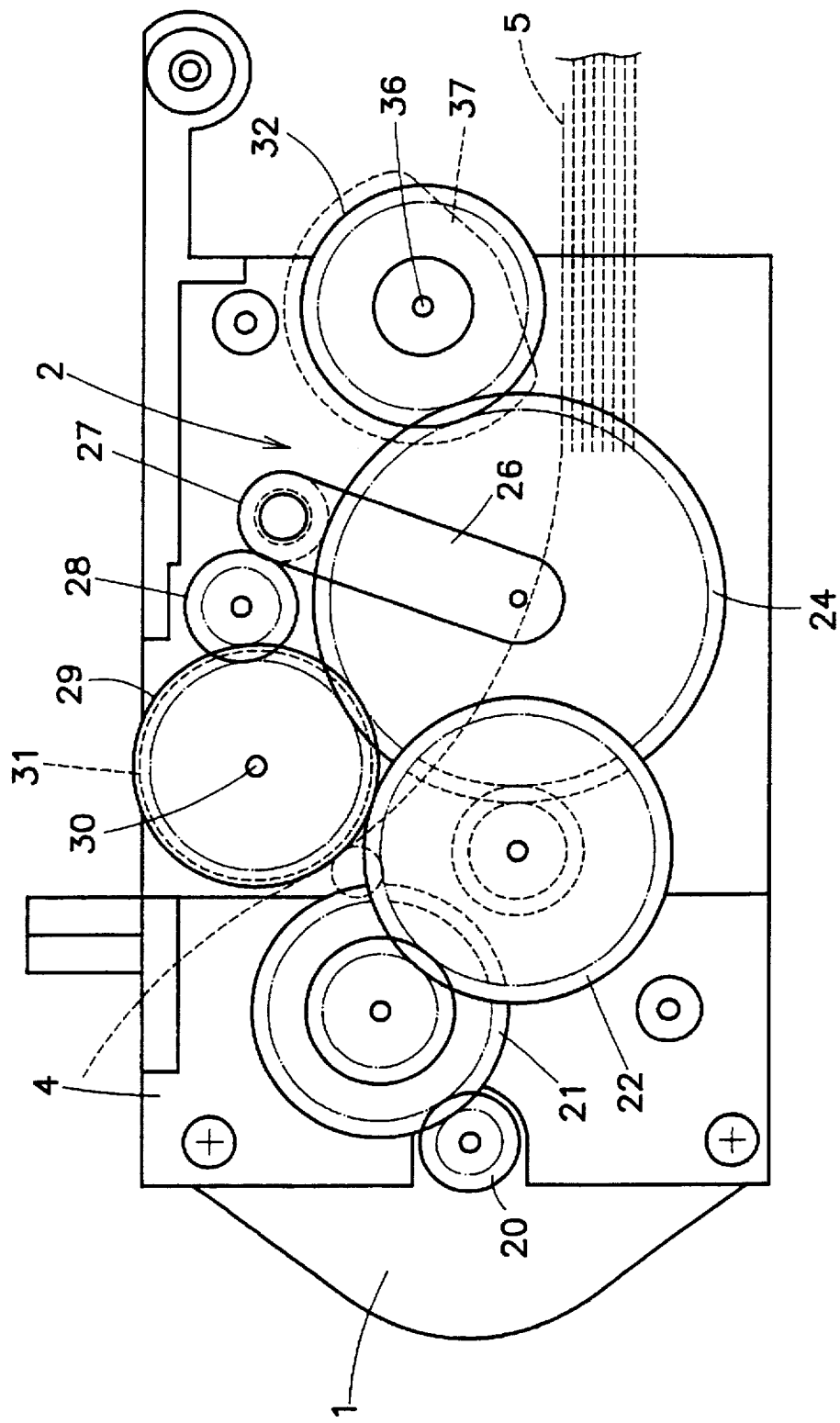

The operation of the present invention is outlined hereinafter with reference to Figures from 3 to 8. When the motor 1 is started and turned counter-clockwise, the rocker 26 is moved rightwards from the position shown in FIG. 3 to the position shown in FIG. 4, causing the rocker gear 27 to be forced into mesh with the first paper pick up gear 32, and therefore the first paper pick up gear 32 is turned clockwise as shown in FIG. 4. When the first paper pick up gear 32 is turned with the rocker gear 27, the second paper pick up gear 33 and the rubber cam 37 are synchronously turned, causing the rubber cam 37 to push paper 5 toward the rubber roll 31. When paper 5 is moved to the rubber roll 31, the plain peripheral surface section 35 of the second paper pick up gear 33 is moved over the return gear 25 without causing the return gear 25 to be turned, therefore the return gear 25 and the paper feeding gear wheel 29 do no work, and the rubber roll 31 is immovable (see FIG. 5). When paper 5 is delivered to the rubber roll 31 by the rubber cam 37, the first paper pick up gear 32 and the second paper pick up gear 33 are continuously rotated. As soon as the toothed periphery of the second paper pick up gear 33 is forced into engagement with the return gear 25, the return gear 25 is driven to turn the paper feeding gear wheel 29 and the rubber roll 31 clockwise to take up paper 5 (see FIG. 6). When the plain peripheral surface section 34 of the first paper pick up gear 32 is moved over the rocker gear 27 during its rotary motion, the first paper pick up gear 32 and the rubber cam 37 are stopped from rotation. Thereafter, the motor 1 is turned clockwise, causing the reduction gear train 21 to be driven by the pinion 20 to turn the transmission gear 24 counter-clockwise. When the transmission gear 24 is turned counter-clockwise, the rocker 26 is turned to move the rocker gear 27 leftwards, causing it to be forced into engagement with the idle wheel 28, and therefore the paper feeding gear wheel 29 is synchronously rotated to feed paper (see FIG. 7). When the paper feeding gear wheel 29 is rotated, the return gear 25 is simultaneously driven to turn the second paper pick up gear 33 clockwise (see FIG. 8), causing the first paper pick up gear 32 and the rubber cam 37 moved back to the initial status, and the rubber cam 37 is disconnected from the transmission power of the motor 1.

While only one embodiment of the present invention has been shown and described, it will be understood that various modifications and changes could be made thereunto without departing from the spirit and scope of the invention disclosed.

What the invention claimed is:

1. A transmission mechanism installed in a machine and driven by a motor to pick up and feed paper, comprising:

a pinion turned by said motor;

a reduction gear train meshed with said pinion and having an output gear;

a transmission gear and a return gear mounted on a common shaft in a frame at one side of the output gear of said reduction gear train;

a rocker having one end connected to said common shaft and an opposite end fixedly mounted with a rocker gear, said rocker gear being meshed with said transmission gear;

an idle wheel mounted on said frame adjacent to said rocker gear;

a transmission shaft mounted inside said frame;

a rubber roll mounted around said transmission shaft and turned with it to feed paper;

a paper feeding gear wheel mounted on one end of said transmission shaft in said frame and meshed with said return gear;

a first paper pick up gear mounted on a revolving axle in said frame at an outer side, and having a peripheral surface section;

a second paper pick up gear mounted on said revolving axle at an inner side of said first paper pick up gear and matched with said return gear, and having a plain peripheral surface section; and, a rubber cam mounted on said revolving axle and synchronously turned with said first paper pick up gear and said second paper pick up gear;

wherein when said motor is turned in one direction, said rocker is moved rightwards to force said rocker gear into mesh with said first paper pick up gear; when said motor is turned in the reversed direction, said rocker is moved leftwards to disengage said rocker gear from said first paper pick up gear and to force it into engagement with said idle wheel.

* * * * *